United States Patent
Conroy et al.

(10) Patent No.: US 9,501,300 B2
(45) Date of Patent: Nov. 22, 2016

(54) CONTROL SYSTEM SIMULATION SYSTEM AND METHOD

(71) Applicant: General Electric Company, Schenectady, NY (US)

(72) Inventors: Patrick Joseph Conroy, Roanoke, VA (US); Terence David Cloughley, Greenville, SC (US)

(73) Assignee: General Electric Company, Schenectady, NY (US)

( * ) Notice: Subject to any disclaimer, the term of this patent is extended or adjusted under 35 U.S.C. 154(b) by 434 days.

(21) Appl. No.: 14/028,368

(22) Filed: Sep. 16, 2013

(65) Prior Publication Data
US 2015/0081267 A1    Mar. 19, 2015

(51) Int. Cl.
| G06G 7/62 | (2006.01) |
|---|---|
| G06F 9/455 | (2006.01) |
| G05B 17/02 | (2006.01) |
| G05B 19/418 | (2006.01) |

(52) U.S. Cl.
CPC .............. *G06F 9/455* (2013.01); *G05B 17/02* (2013.01); *G05B 19/41885* (2013.01); *G05B 2219/32345* (2013.01); *G05B 2219/34333* (2013.01); *Y02P 90/26* (2015.11)

(58) Field of Classification Search
CPC ............ G06F 9/455; G05B 19/41885; G05B 2219/32345; G05B 2219/34333; G05B 17/02; Y02P 90/26
USPC .......................................................... 703/7
See application file for complete search history.

(56) References Cited

U.S. PATENT DOCUMENTS

| 6,134,514 A | 10/2000 | Liu et al. |
|---|---|---|
| 6,671,659 B2 | 12/2003 | Troia et al. |
| 8,056,062 B2 | 11/2011 | Bowers et al. |
| 2009/0089031 A1* | 4/2009 | Sturrock ............. G06F 17/5009 703/7 |
| 2009/0312850 A1* | 12/2009 | Higuchi ................. G05B 17/02 700/29 |
| 2011/0131017 A1 | 6/2011 | Cheng et al. |
| 2011/0252264 A1 | 10/2011 | Solinas et al. |

(Continued)

FOREIGN PATENT DOCUMENTS

WO    2011023204    3/2011

OTHER PUBLICATIONS

Barney, "Introduction to Parallel Computing", pp. 1-39, Mar. 4, 2010.

(Continued)

*Primary Examiner* — Kandasamy Thangavelu
*Assistant Examiner* — Andre Pierre Louis
(74) *Attorney, Agent, or Firm* — Fletcher Yoder, P.C.

(57) ABSTRACT

A non-transitory tangible computer-readable medium may include instructions executable by a processor in a simulation system to perform a simulation. The instructions may include to wait for a plurality of virtual controllers to complete a previous simulation step, write a result of the previous simulation step from each of the plurality of virtual controllers to a shared memory, read an input from the memory to each of the plurality of virtual controllers, initiate a simulation step on each of the plurality of virtual controllers, and upon initiation of the simulation step in each of the plurality of virtual controllers, indicate completion of the simulation, in which the plurality of virtual controllers include a controller model having a plurality of simulation steps and the instructions are configured to be executed by the processor in parallel.

20 Claims, 6 Drawing Sheets

(56) References Cited

U.S. PATENT DOCUMENTS

| | | |
|---|---|---|
| 2011/0271266 A1 | 11/2011 | Kreft et al. |
| 2012/0162235 A1 | 6/2012 | Drath |
| 2013/0191106 A1* | 7/2013 | Kephart ................. G05B 17/02 703/21 |
| 2013/0211601 A1* | 8/2013 | Cheng ................. G06F 17/5018 700/282 |
| 2015/0019191 A1* | 1/2015 | Maturana ............... G05B 17/02 703/13 |

OTHER PUBLICATIONS

European Search Report and Opinion issued in connection with corresponding EP Application No. 14184541.2 on Feb. 9, 2015.

* cited by examiner

CONTROL SYSTEM SIMULATION SYSTEM AND METHOD

BACKGROUND OF THE INVENTION

The subject matter disclosed herein relates generally to simulation systems, and more specifically, to simulation systems used to simulate operation of a control system useful in controlling plants, equipment, and processes.

Control systems for processes, plants, and equipment, may include a wide variety of logic to configure how the control system monitors and controls the processes, plants and equipment. For example, a control system may include a controller designed to monitor and control the process, plant, and/or equipment. To improve operation of the control system, a simulation system, including virtual controllers, component models, process models, or any combination thereof, may be utilized to simulate the operation of the control system. Accordingly, it would be beneficial to improve the simulation logic of such a simulation system.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a non-transitory tangible computer-readable medium may include instructions executable by a processor in a simulation system to perform a simulation. The instructions may include to wait for a plurality of virtual controllers to complete a previous simulation step, write a result of the previous simulation step from each of the plurality of virtual controllers to a shared memory, read an input from the memory to each of the plurality of virtual controllers, initiate a simulation step on each of the plurality of virtual controllers, and upon initiation of the simulation step in each of the plurality of virtual controllers, indicate completion of the simulation, in which the plurality of virtual controllers include a controller model having a plurality of simulation steps and the instructions are configured to be executed by the processor in parallel.

In a second embodiment, a method to operate a communication package in a simulation system includes receiving an instruction from a simulation executive to execute a simulation step on a plurality of virtual controllers, in which each of the plurality of virtual controllers comprises a controller model comprising a plurality of simulation steps. The method further includes waiting for each of the plurality of virtual controllers to complete a previous simulation step, instructing each of the plurality of virtual controllers to write a result of the previous simulation step to a shared memory, instructing each of the plurality of virtual controllers to read an input from the shared memory, instructing each of the plurality of virtual controllers to begin execution of the simulation step to enable each of the virtual controllers to execute the simulation step in parallel, transmitting a complete status to the simulation executive without waiting for the plurality of virtual controllers to complete the simulation step.

In a third embodiment, a simulation system that simulates operation of a control system includes a processor that may execute a simulation executive to coordinate operation of the simulation system and a plurality of virtual controllers, in which each of the plurality of virtual controllers includes a controller model including a plurality of simulation steps to simulate operation of a physical controller and each of the plurality of virtual controllers executes simulation steps in parallel with the other of the plurality of virtual controllers. The processor may also execute a communication interface communicatively coupled to the simulation executive and the plurality of virtual controllers, in which the communication interface receives an instruction from the simulation executive to execute a simulation step, instructs each of the plurality of virtual controllers to begin execution of the simulation step in parallel, and transmits a complete status to the simulation executive upon beginning execution of the simulation step in each of the plurality of virtual controllers.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
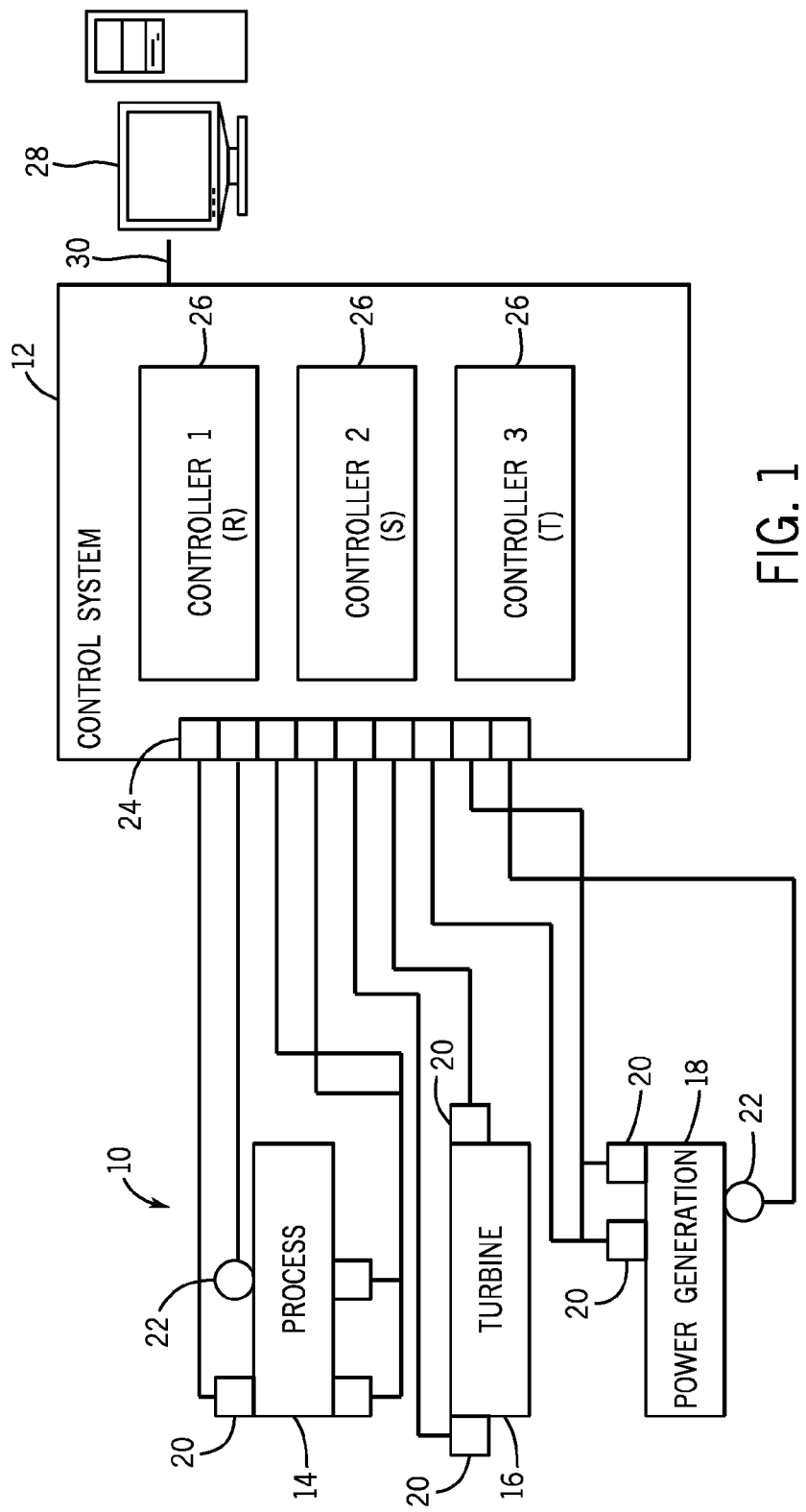
FIG. 1 is a block diagram of an industrial plant including a control system, in accordance with an embodiment.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Generally, a control system includes various controllers (e.g., industrial controllers) suitable for monitoring and/or controlling processes (e.g., industrial processes), plants, and/or equipment. For example, a controller may monitor and control the operation of other components, such as machinery, and processes in an industrial system, such as a gas turbine system, a gasification system, a steam turbine system, a wind turbine system, a water turbine system, a power generation system, integrated gasification combined cycle system, or any combination thereof.

The operation of the control system, processes, plants and/or equipment may be simulated by a simulation system running on a workstation or other computing device. In some embodiments, the simulation may be progressed (e.g., executed up to a discrete number of desired steps) to enable analysis of part of a process, plant or equipment in a step-by-step manner. For example, a control action or sequence of actions to be performed by a physical controller may first be simulated in a virtual controller. Accordingly, the simulation system may include various models, which each includes a plurality of simulation steps, suitable for simulating the operation of physical controllers, components, and processes. In some embodiments, the simulation system may execute simulation steps sequentially. For example, the simulation system may execute a first simulation step, wait for the first simulation step to complete, execute a second simulation step, wait for the second simulation to complete, and so on. However, it would be beneficial to improve the simulation efficiency of a simulation system by more efficiently utilizing advancements in processing architecture, such as multi-threaded and multi-core processors.

Accordingly, the present disclosure includes, in one embodiment, a non-transitory tangible computer-readable medium including instructions executable by a processor in a simulation system to perform a simulation. The instructions may include to wait for a plurality of virtual controllers to complete a previous simulation step, write a result of the previous simulation step from each of the plurality of virtual controllers to a shared memory, read an input from the memory to each of the plurality of virtual controllers, initiate a simulation step on each of the plurality of virtual controllers, and upon initiation of the simulation step in each of the plurality of virtual controllers, indicate completion of the simulation, in which the plurality of virtual controllers include a controller model having a plurality of simulation steps and the instructions are configured to be executed by the processor in parallel. In other words, instead of executing simulation steps sequentially, the simulation steps may be executed in parallel to improve the simulation efficiency of the simulation system. In some embodiments, this may enable the simulation system to simulate operation substantially faster than real-time operation. Several novel techniques are described below, which may improve time of simulation and/or memory/processing constraints when simulating, for example, parallel branches related to physical controllers. As can be appreciated, this may also improve the efficiency of testing, validation of components and the like.

By way of introduction, FIG. 1 depicts one embodiment of an industrial system 10 (e.g., a power generation plant) coupled to an industrial control system 12. Although an industrial system 10 is described, the techniques described herein may be adapted to other processes, plants, or equipment. As depicted, the industrial system 10 includes a process 14, a turbine 16, and a power generation component 18. Other embodiments of the industrial system 10 may include other processes and components, such as gasifiers, a gas treatment system (e.g., acid gas removal), air separation units, compressors, gears, turbo-expanders, pumps, motors, generators, fans, blowers, agitators, mixers, centrifuges, pulp refiners, ball mills, crushers/pulverizers, extruders, pelletizers, cooling towers/heat exchanger fans, and the like.

Additionally, in the depicted embodiment, the process 14, turbine 16, and power generation component 18 may include any number of sensors 20 and actuators/motors 22. More specifically, the sensors 20 may provide information regarding process conditions. For example, the sensors may monitor temperature, pressure, speed, fluid flow rate, vibration, noise, exhaust emissions, power output, clearance, or any other suitable parameter. The actuators 22 may perform a mechanical action in response to an input signal. For example, the actuators 22 may control a fuel injection rate, a diluent or water injection rate, a coolant rate, a power output level, a speed, a flow rate, a clearance, and so forth. As depicted, the sensors 20 and actuators 22 are in communication with the control system 12 via input/outputs 24. More specifically, the sensors 20 and actuators 22 may be in communication with controllers 26 (e.g., programmable logic controllers) to facilitate monitoring and control of the industrial system 10. As used herein, the controllers 26 may be referred to as "physical controllers." In some embodiments, the controllers 26 may be a Mark VIe™ control or Mark VIeS™ control, made available by General Electric Company of Schenectady, N.Y. In some embodiments, only one controller 26 is used. In another embodiments, three controllers are used (e.g., R, S, T core controllers) to provide a triple modular redundant (TMR) control system 12 having enhanced redundancy and failover capabilities. The TMR control system 12 may, for example, perform a task with the output determined by a voting of the three cores R, S, and T. In other embodiments, four or more cores may be used.

Figure 2:
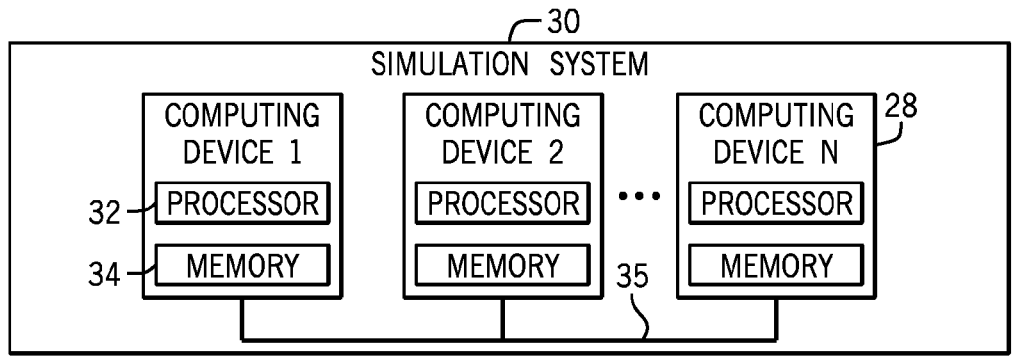
FIG. 2 is a block diagram of a simulation system suitable for simulating the control system of FIG. 1, in accordance with an embodiment.

Additionally, the control system 12 may be coupled to and communicate with one or more workstations 28, which may include desktop computers, laptop computers, or other suitable computing devices. The workstation 28 may enable an operator to perform various functions, such as monitoring the components of the control system 12 (e.g., controllers 26 and input/outputs 24), and simulating operation of the control system 12 and the industrial system 10. More specifically, to facilitate simulation, one or more workstation or other computing devices 28 may be included in a simulation system. That is, the simulation may include multiple computing devices 28 to provide for additional computational capabilities. A block diagram of one embodiment of a simulation system 30 is depicted in FIG. 2. As depicted, the simulation system 30 includes multiple computing devices 28 (e.g., computing device 1, computing device 2, computing device N). Furthermore, each computing device 28 includes a processor 32 and memory 34. In some embodiments, the processor 32 may be a multi-thread processor, a multi-core processor, multiple discrete processors, or any combination thereof. Accordingly, each of the computing devices 28, and more specifically the processor 32 and the memory 34, may enable an operator to perform functions, such as monitoring the components of the control system 12 (e.g., controllers 26 and input/outputs 24) and simulating operation of the control system 12 and the industrial system 10. Additionally, each of the computing devices 28 may be communicatively coupled with the other computing devices 28 via a network 35, such Ethernet or the like. As can be appreciated, by utilizing the techniques described herein, other embodiments of the simulation system 30 utilize fewer computing devices 28, and in some embodiments may include only one computing device 28.

Figure 3:
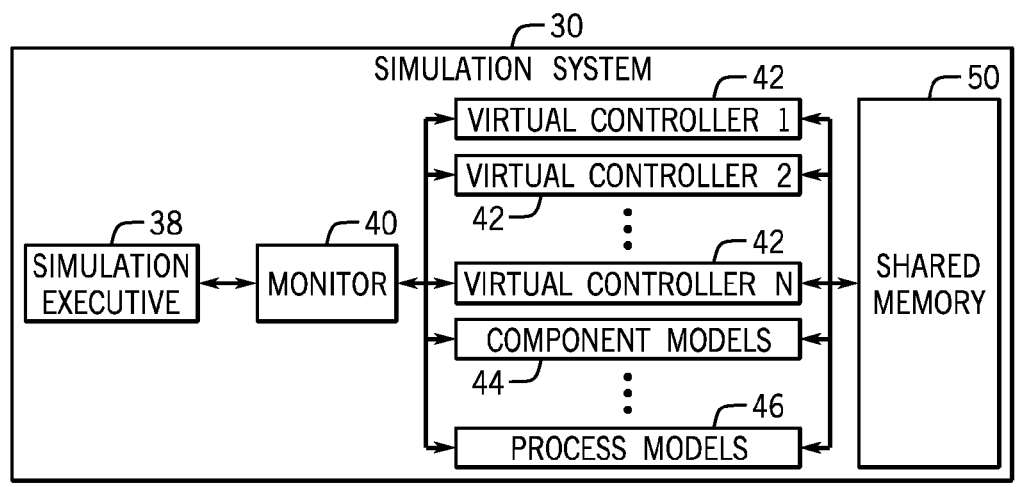
FIG. 3 is an information flow diagram for the simulation system depicted in FIG. 2, in accordance with an embodiment.

To simulate operation of the control system 12 and the industrial system 10, the simulation system 30 may utilize virtual controllers and various models. More specifically, the simulation system 30 may simulate the operation of the control system 12 by executing one or more virtual controllers and the operation of the industrial system 10 by executing one or more component models and process models. One embodiment of the information flow within the simulation system 30 is depicted in FIG. 3. As depicted, the simulation system 30 includes a simulation executive 38, a monitor 40, virtual controllers 42, component models 44, process models 46, and shared memory 50. In some embodiments, the simulation executive 38, monitor 40, virtual controllers 42, component models 44, and process models 46 may be executed by the processor 32 and stored by the memory 34 in the various computing devices 30 in the simulation system 30. For example, the simulation executive 38 may be stored and executed on a first computing device while a monitor 40 and each of the virtual controllers 42 may be stored and executed on a second computing device. Additionally, the shared memory 50 may utilize the physical memory 34 of the various computing devices 30. The desired configuration of the simulation system 30 may be adjusted based on various factors, such as the computing and storage capabilities of each computing device 28 and the computing and storage requirements of the virtual controllers 42 and models (e.g., component models 44 and process models 36). Accordingly, the simulation system 30 is described below as a whole without differentiating between the various physical computing devices 28.

As depicted, the simulation executive 38 is communicatively coupled to the monitor 40 to enable the simulation executive 38 and the monitor 40 to communicate. For example, the simulation executive 38 may communicate instructions to the monitor 40, and more generally provide for simulation management and control. Additionally, the monitor 40 is communicatively coupled to the virtual controllers 42, component models 44, and process models 46 to enable the monitor 40 to control the operation of the virtual controllers 42, component models 44, and process models 46. Furthermore, the virtual controllers 42, component models 44, and process models 46 may be coupled to the shared memory 50 to enable the virtual controllers 42, component models 44, and process models 46 to write to and read from the shared memory 50.

More specifically, the simulation executive 38 may be responsible for coordinating the execution of the simulation. In other words, the simulation executive 38 may maintain time coherency between the execution of simulation steps because the simulation steps may each have a different execution period. For example, a component model 44 may have an execution step or period of 10 ms while a virtual controller may have an execution step or period of 40, 80, 120, or 160 ms. Accordingly, the simulation executive 38 may instruct specific virtual controllers 42 and models (e.g., component models 44 and process models 46) to perform a specific action. For example, the simulation executive 38 may transmit an instruction identifying a virtual controller 42 and a control action, such as executing a control process step. To facilitate the communication of the instructions between the simulation executive 38 and the virtual controller 42 or various models, the monitor 40 may be utilized as an intermediary. In other words, the monitor 40 may be a communication interface or system. More specifically, the monitor 40 may receive an instruction from the simulation executive 38 identifying which virtual controllers 42 or models are to perform a specific control action. Based on this instruction, the monitor 40 may instruct the identified virtual controllers 42 to perform the specified control action. Accordingly, in some embodiments, the monitor 40 may be included on the same computing device 28 as a virtual controller 40 that the device 28 executes or instructs. Additionally, multiple monitors 40 may be utilized. For example, in some embodiments, one monitor 40 may be included on each computing device 28 that executes a virtual controller 42 or models 44, 46. Additionally, the simulation executive 38 may provide for other actions, such as writing to the shared memory 50 and reading from the shared memory 50. In some embodiments, the simulation executive 38 may be an Accelerated Real Time Engine Model Interactive Simulation (ARTEMIS), made available by General Electric Company of Schenectady, N.Y.

As described above, the simulation system 30 may include virtual controllers 42, component models 44, process models 46, or any combination thereof to enable simulation of the control system 12 or components of the control system 12. More specifically, the virtual controllers 42 may simulate the operation of a physical controller 26. Accordingly, each virtual controller 42 may include a controller model made up of a plurality of simulation steps or computer executable instructions. In some embodiments, the virtual controllers 42 may simulate a Mark VIe™ controller and/or a Mark VIeS™ controller with substantial fidelity.

Figure 4:
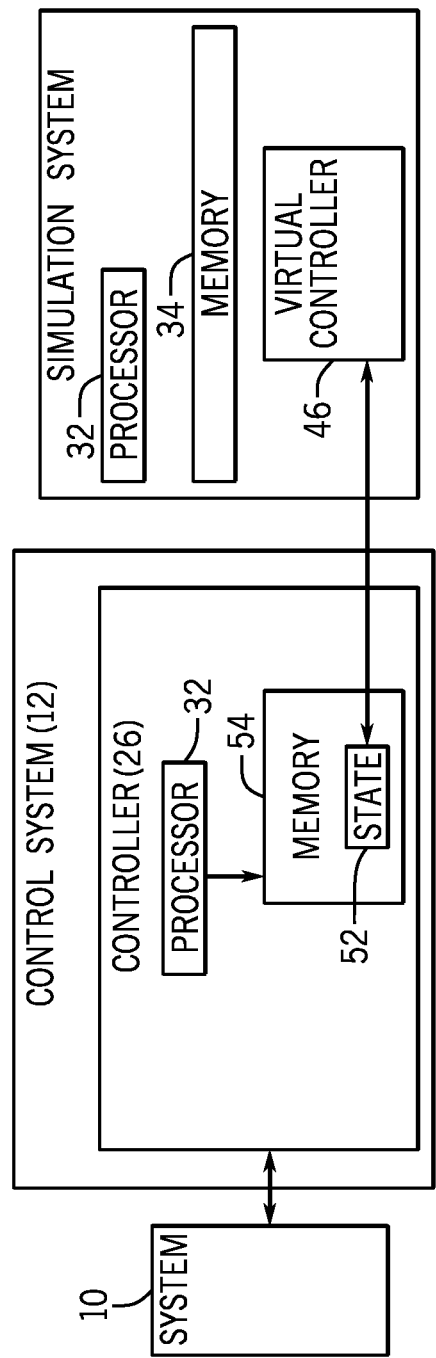
FIG. 4 is a block diagram of a virtual controller receiving a captured state from a physical controller, in accordance with an embodiment.

In some embodiments, the simulation performed in a virtual controller 42 may be based at least in part on a captured state of one or more of the physical controllers 26, which may include process variables, state variable, diagnostic information, alarm information, event information, control commands, and the like. One embodiment of a virtual controller 42 receiving a captured state from a physical controller 26 is depicted in FIG. 4. As depicted, a captured state 52 of the physical controller 26 is stored in the memory 54 of the physical controller 26. The captured state 52 may then be communicated to the virtual controller 46. For example, the captured state 52 may be captured either after one or more execution steps of the controller 26, at a desired time period (e.g., 1, 10, 100, 1000, or more milliseconds), by using debugging setpoints, or a combination thereof. After receiving the captured state 52, the captured state may be restored in the virtual controller 46. For example, the virtual controller 46 may choose a corresponding model state that matches the captured state 52. The virtual controller 46 may then execute a simulation step based at least in part on the corresponding model state.

Similarly, each component model 44 may model the operation of a component (e.g., turbine 16 or power generation 18), and each process model 46 may model the operation of process 14 in the industrial system 10, in which each model is made up of a plurality of simulation steps or executable instructions. These models may be based on first principles, such as physics based techniques (e.g., low cycle fatigue (LCF) life prediction models, computational fluid dynamics (CFD) models, finite element analysis (FEA) models, solid models (e.g., parametric and non-parametric modeling), and/or 3-dimension to 2-dimension FEA mapping models). Accordingly, in some embodiments, the component models 44 may be Easy5 models, made available by MSC Software Corporation of Santa Ana, Calif. Additionally, in some embodiments, the process models 46 may be DynSim models, made available by Invensys PLC of London, United Kingdom.

Furthermore, the shared memory 50 may be utilized to facilitate communication of data between each of the virtual controllers 42 and/or models. More specifically, inputs for each simulation step may be read from the shared memory 50 and outputs (e.g., results) of each simulation steps may be stored in the shared memory 50. In other words, the shared memory 50 stores the simulated status (e.g., operation parameters) of the control system 12 and/or the industrial system 10, updates the statuses after the execution of each simulation iteration, and may be accessible (e.g., read/write) by any of the simulation system 30 components. For example, one iteration of the simulation may be performed, the results from that iteration may be stored in the shared memory 50 to update the statuses, and a subsequent iteration may be performed with the updated statuses. As used herein, one iteration of the simulation is intended to describe the set of simulation steps that are executed based on the same status of the control system 12 and/or industrial system 10. In some embodiments, the shared memory 50 may be a Reflective Memory system, made available by General Electric Company of Schenectady, N.Y.

Figure 5:
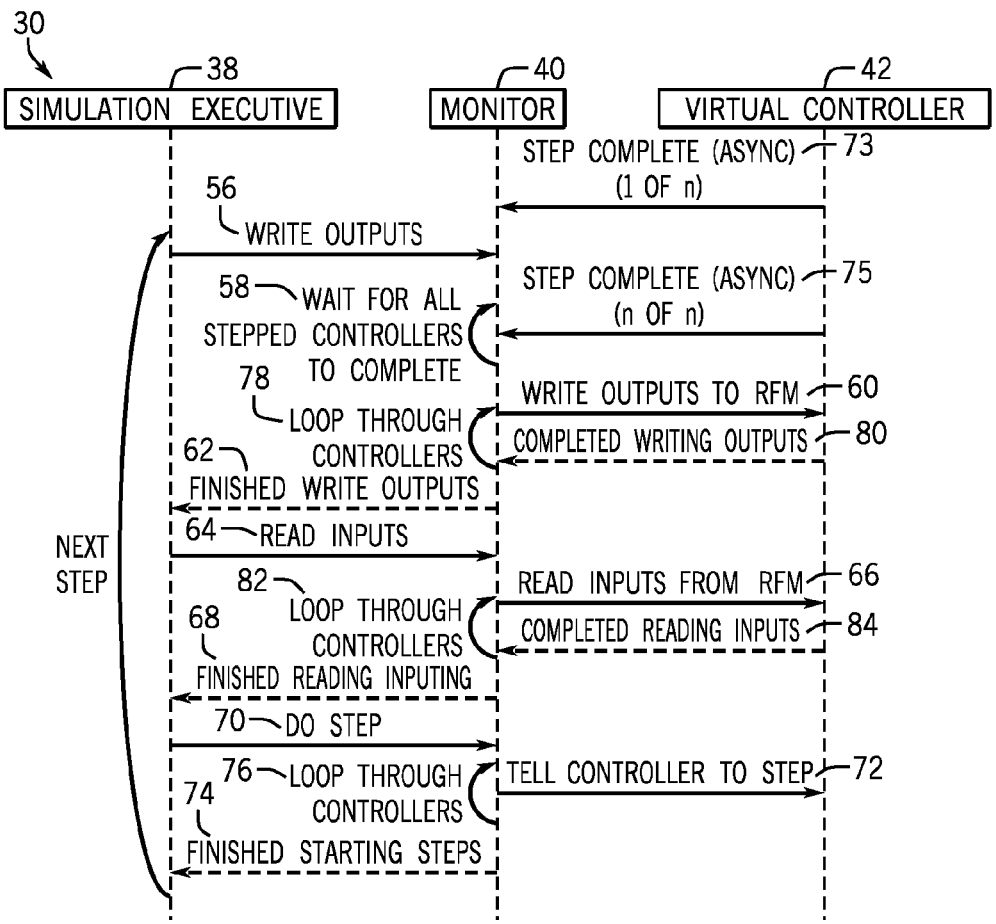
FIG. 5 is an information flow diagram for the simulation system depicted in FIG. 2, in accordance with an embodiment.

As described above, the simulation system 30 enables the simulation of the control system 12 and/or the industrial system 10. One embodiment of the operation of the simulation system 30 is depicted in FIG. 5. To simplify discussion, the simulation system 30 will be described in relation to simulation of the control system 10. However, it can be appreciated that the techniques described below may be applied to simulation of the industrial system 10 or the simulation of any process, equipment, or plant that utilizes simulation models made up of a plurality of simulation steps.

FIG. 5 is an information flow diagram depicting an embodiment of information flows between the simulation executive 38, the monitor 40, and the virtual controller 42 of the simulation system 30. As depicted, execution of a simulation iteration begins when the monitor 40 receives a write outputs instruction from the simulation executive 38 (process arrow 56). The monitor 40 may then wait for each of virtual controllers 42 to complete execution of a previous simulation step (process arrow 58). Once the virtual controllers 42 have completed execution, the monitor 40 instructs each of the virtual controllers 42 to write the results (e.g., outputs) of the previous simulation step into the shared memory 50 (process arrow 60). After the results are stored, the monitor 40 returns a finished write outputs status to the simulation executive 38 (process arrow 62). The monitor 40 then receives a read inputs instruction from the simulation executive 38 (process arrow 64) and instructs each of the virtual controllers 42 to read inputs for a subsequent simulation step from the shared memory 50 (process arrow 66). After the inputs are read, the monitor 40 returns a finished read inputs status to the simulation executive 38 (process arrow 68). The monitor 40 then receives a do step instruction from the simulation executive 38 (process arrow 70) and instructs each of the virtual controllers 42 to begin execution of a simulation step in parallel (process arrow 72). Once the simulation step has been initiated in the virtual controllers 42, the monitor 40 returns a finished starting steps or completed status to the simulation executive 38 (process arrow 74).

More specifically, the monitor 40 may wait for each of the virtual controller 42 to complete execution of a previous simulation step (process arrow 58) by checking the execution status of the virtual controllers 42. As used herein the execution status of the virtual controllers 42 is intended to indicate whether the virtual controller 42 has or has not completed a simulation step. Additionally, the execution status may indicate the percent completed. In some embodiments, the execution status of each of the virtual controller 42 may be maintained as an EventHandle that is stored as part of an array. Once a virtual controller 42 completes execution of a simulation step, a callback routine will set the EventHandle to indicate that the virtual controller 42 has completed the simulation step (process arrows 73 and 75). In some embodiments, not all of the virtual controllers 42 execute a simulation step during each iteration. Accordingly, the monitor 40 may wait for the virtual controllers 42 that will execute a simulation step in the next iteration of the simulation. Additionally, before the monitor 40 instructs the virtual controllers 42 to execute a simulation step, the EventHandle may be cleared to indicate that the virtual controllers 42 have not completed the subsequent simulation step.

Furthermore, the monitor 40 may wait a specified time period for each of the virtual controllers 42 to complete. If one or more virtual controllers 42 has not completed within the specified time period, the monitor 40 may timeout and cease operation of the simulation. The monitor 40 may timeout because if one or more of the virtual controllers 42 has not completed the simulation step, subsequent simulation steps may be executed based on an incomplete status of the control system 12. As described above, some virtual controllers 42 may have varying execution periods. Accordingly, in some embodiments, the specified time period may be equal to the longest execution period of the virtual controllers 42.

The monitor 40 may instructs each of the virtual controllers 42 to begin (e.g., initiate) execution of a simulation step in parallel (process arrow 72) by instructing each of the virtual controllers 42 to execute a simulation step in a parallel thread, processing core, processor, or a combination thereof. For example, the monitor 40 may utilize a .NET delegate, thereby executing each simulation step on a thread from the .NET thread pool. In some embodiments, execution of each simulation step is performed on a separate processing thread or core. Additionally or alternatively, execution of each simulation step may be allocated between a few threads or cores. In other words, execution of more than one simulation step may be allocated to each thread or core. The exact assignment of simulation steps to threads and/or cores may be customized based on the processing capabilities of the processors 32 and the processing requirements of the simulation steps.

Additionally, in the depicted embodiment, the monitor 40 sequentially instructs the virtual controllers 42 to begin operation (process arrow 76). For example, the monitor 40 may instruct a first virtual controller to being execution, subsequently instruct a second virtual controller to begin execution, and so on. Additionally or alternatively, the monitor 40 may instruct the virtual controllers 42 to begin execution substantially simultaneously. For example, the monitor 40 may broadcast an instruction to the virtual controllers 42 to being execution. In either embodiment, each of the virtual controllers 42 may execute the simulation steps in parallel because, as described above, the execution is performed on a multiple parallel threads, cores, processors, or any combination thereof.

Furthermore, in the depicted embodiment, the monitor 40 instructs the virtual controllers 42 to write to the shared memory 50 sequentially (process arrow 78). For example, the monitor 40 instructs a first virtual controller to write to the shared memory 50, receives a write complete status (process arrow 80) from the first virtual controller, subsequently instructs a second virtual controller to write to the shared memory 50, and so on. Similarly, the monitor 40 instructs the virtual controllers to read from the shared memory 50 sequentially (process arrow 82). For example, the monitor 40 instructs a first virtual controller to read from the shared memory 50, receives a read complete status (process arrow 84) from the first virtual controller, subsequently instructs a second virtual controller to read from the shared memory 50, and so on. Additionally or alternatively, the monitor 40 may substantially simultaneously instruct the virtual controller 42 to read or write from the shared memory 50, for example, by broadcasting the instruction.

Finally, once the simulation step has been initiated in the virtual controllers 42, the monitor 40 returns a completed status to the simulation execution (process arrow 74). In other words, the monitor 40 returns a completed status without waiting for the virtual controllers 42 to complete execution of the simulation steps. As described above, completion is checked when the simulation executive 38 instructs the virtual controllers 42 to perform a subsequent control action, such as write outputs, via the monitor 40.

In other embodiments, the operation of the simulation system 30 may be adjusted to further improve the efficiency of the simulation system 30. For example, the communication between the simulation executive 38 and the monitor 40 may be reduced by utilizing a monitor 40 with increased processing power. More specifically, the communication between the simulation executive 38 and the monitor 40 may be reduced to the monitor 40 receiving a do step instruction (process arrow 70) and returning a completed status (process arrow 72) once a simulation step is initiated in the virtual controllers 42. The monitor 40 may then instruct the virtual controllers 42 (e.g., write output 60, read input 66, and execute simulation step 72) in response to receiving the do step instruction.

Figure 6:
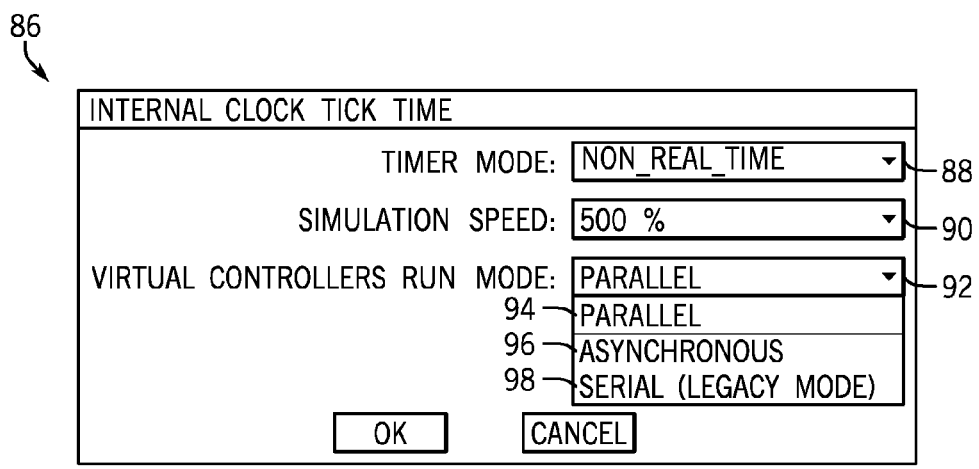
FIG. 6 is a settings display for the simulation system depicted in FIG. 2, in accordance with an embodiment.

In benchmarking the above described techniques, the techniques were implemented in a simulation of a Duke-Edwards integrated gasification combined cycle (IGCC) plant located in Knox County, Ind. The simulation system 30 included three Dell T5500 dual quad-core computers (e.g., three computing devices 28), made available from Dell Inc. of Roud Rock, Tex. As described above, the virtual controllers 42 may be executed sequentially or in parallel. Accordingly, a graphical interface on the simulation system 30, such as the one depicted in FIG. 6, may enable an operator to choose between sequential or parallel operation suitable for cycling (e.g., running a clock cycle) through the simulation. More specifically, FIG. 6 depicts an embodiment of a display (e.g., settings window 86) that enables an operator to select a timer mode 88, a simulation speed 90, and a virtual controller run mode 92. As depicted, the virtual controller run mode 92 includes a drop down menu that enables an operator to choose between a parallel mode 94, an asynchronous mode 96, and a serial (i.e., sequential) mode 98. Thus, an operator may easily switch between each of the three simulation modes by selecting a different simulation mode in the virtual controller run mode menu 92.

Figure 7:
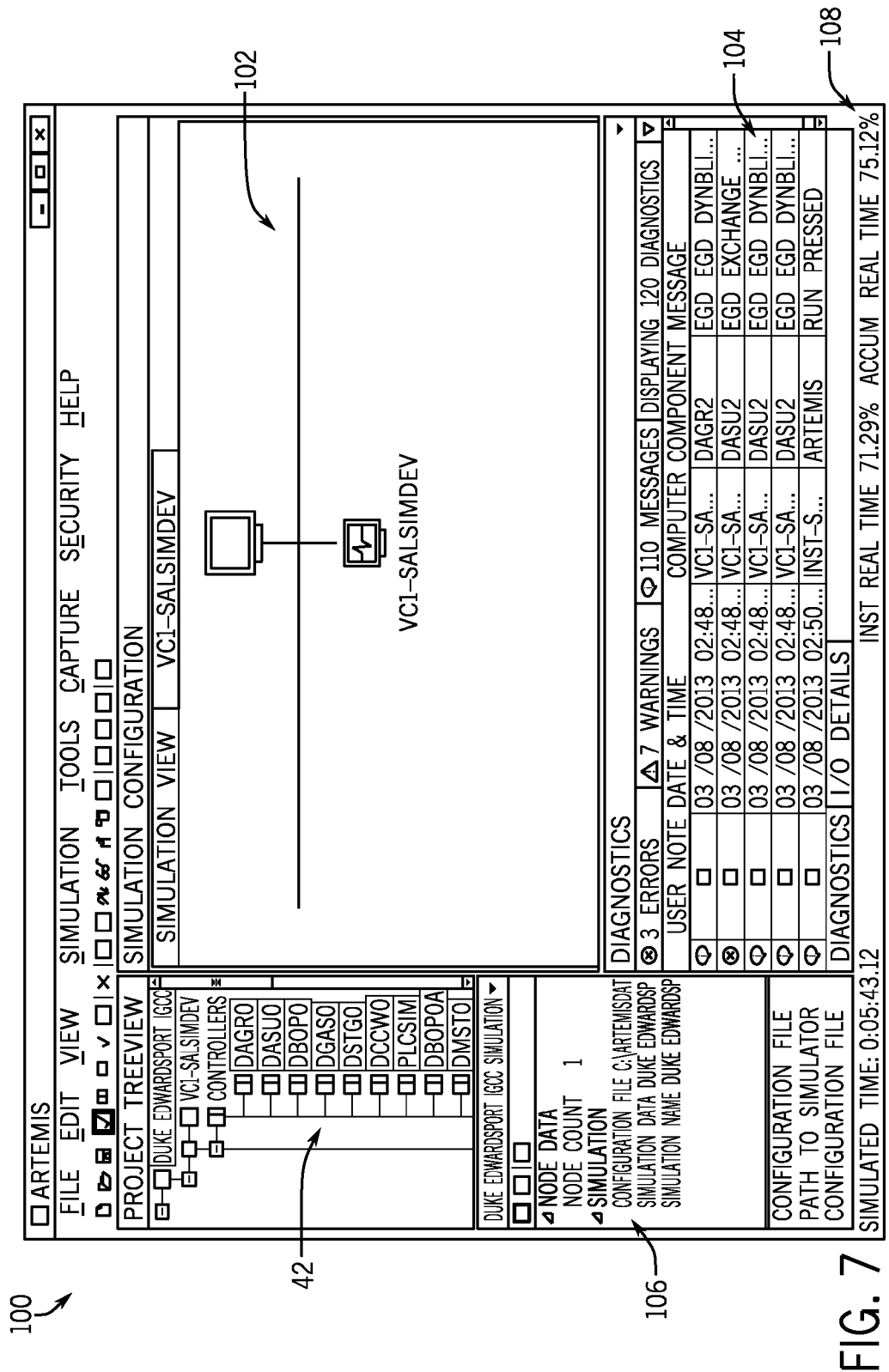
FIG. 7 is a display illustrating operations of the simulation system depicted in FIG. 2 when a sequential mode is selected, in accordance with an embodiment.

Results 100 from benchmarking the Duke-Edwards IGCC plant when the sequential mode 98 is selected for execution of the virtual controllers 42 is depicted in a screen capture of the simulation executive 38 shown in FIG. 7. As depicted, the simulation results 100 includes a graphical representation of the simulation system 102, a simulation execution list 104 that describes the simulation steps that have been executed, and a settings window 106 that describes the settings of the simulation system 30. In operation, the simulation system 30 simulated operations of the plant up to 75.12% of real-time operations of the plant (arrow 102). Additionally, the processors 32 in the simulation system 30 were loaded to around 20% of total processing capabilities.

Figure 8:
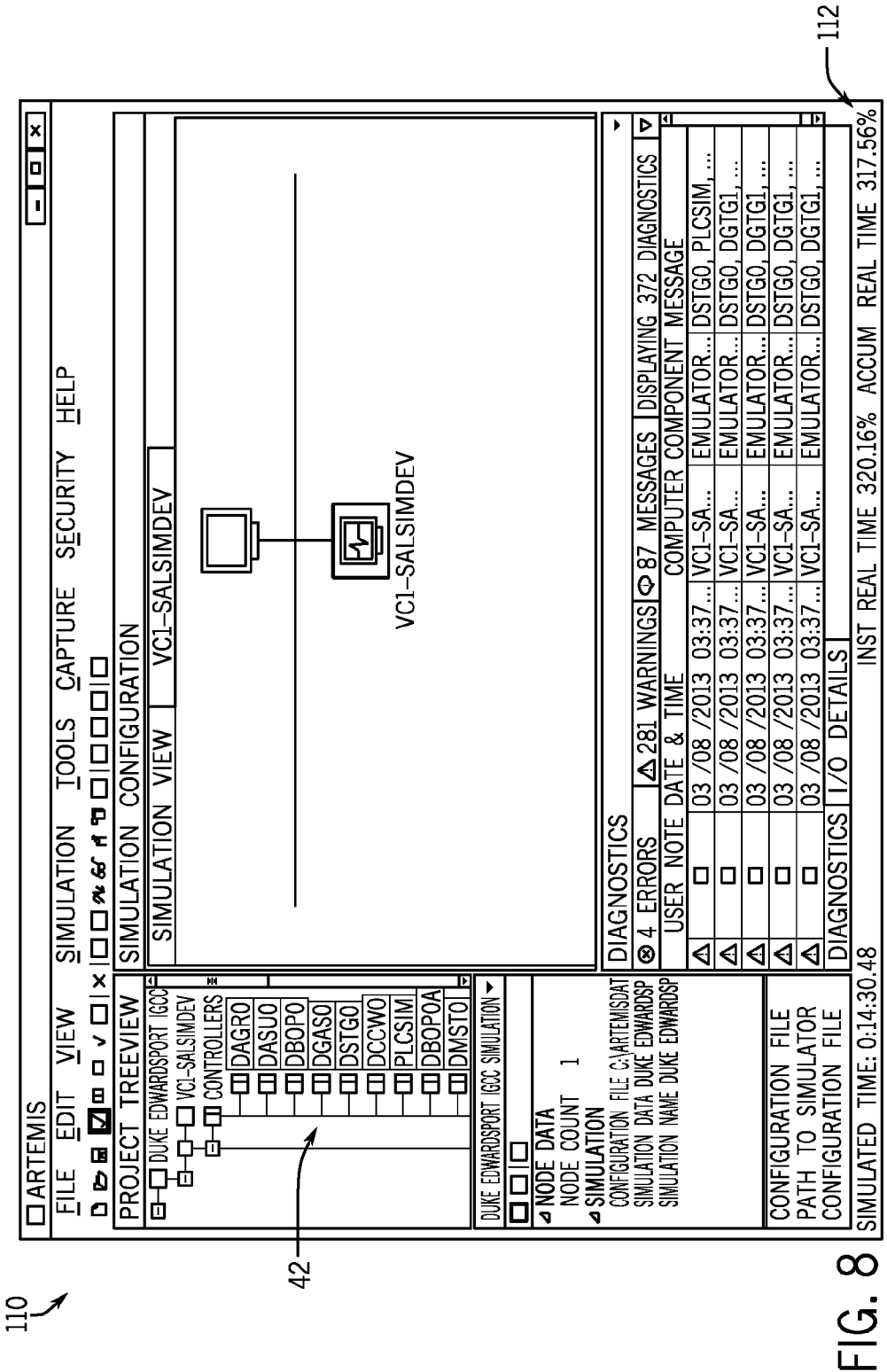
FIG. 8 is a display illustration operations of the simulation system depicted in FIG. 2 when a parallel mode is selected, in accordance with an embodiment.

Results 110 from benchmarking the Duke-Edwards IGCC plant when the parallel mode 92 is selected for execution of the virtual controllers 42 is depicted in a screen capture of the simulation executive depicted in FIG. 8. In operation, the simulation system 30 simulated the operation of the plant up to 317.56% of real-time operation of the plant (arrow 112). Additionally, the processors 32 in the simulation system 30 were loaded to around 80% of total processing capabilities. Accordingly, the simulation efficiency may be vastly improved by better utilizing the processing architecture of the processors 32.

Technical effects of the present disclosure include improving the simulation efficiency of a simulation system 30. More specifically, the simulation efficiency may be improved by better utilizing the processing capabilities of the simulation system to execute simulation steps in parallel. In some embodiments, this may include executing simulation steps in parallel on multiple threads, processing cores, or processors. Accordingly, the simulation speed of the simulation system 30 may also be improved, which enables operations, such as testing or validation, to also be completed more efficiently.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A, tangible, non-transitory tangible computer-readable medium configured to store instructions executable by one or more processors in a simulation system configured to simulate operation of an industrial system using a plurality of virtual controllers, wherein the instructions comprise instructions to:

receive, using the one or more processors, a simulation instruction from a simulation executive to execute a simulation step in the simulation system, wherein the operation of the industrial system is controlled based at least in part on results from execution of the simulation step;

determine, using the one or more processors, a first subset of virtual controllers from the plurality of virtual controllers to use to execute the simulation step, wherein one or more of the plurality of virtual controllers have different execution periods;

determine, using the one or more processors, whether each of the first subset of virtual controllers has completed execution of the one or more previous simulation steps;

instruct, using the one or more processors, each of the first subset of virtual controllers to begin execution of the simulation step once each of the first subset of virtual controllers has completed execution of the one or more previous simulation steps to enable the first subset of virtual controllers to execute the simulation step in parallel; and transmit, using the one or more processors, an initiation complete status to the simulation executive once the simulation step has been initiated in each of the first subset of virtual controllers to enable the simulation executive to instruct the simulation system to execute a next simulation step directly after the simulation step without regard to whether execution of the simulation step has been completed.

2. The computer-readable medium of claim 1, wherein the instructions to instruct each of the first subset of virtual controllers to begin execution of the simulation step comprise instructions to instruct each of the first subset of virtual controllers to execute the simulation step in a separate computing thread.

3. The computer-readable medium of claim 1, wherein the instructions to instruct each of the first subset of virtual controllers to being execution of the simulation step comprise instructions to instruct each of the first subset of virtual controllers to execute the simulation step in a separate processing core.

4. The computer-readable medium of claim 1, wherein the instructions to instruct each of the first subset of virtual controllers to begin execution of the simulation comprise instructions to instruct the first subset of virtual controllers to begin execution of the simulation step sequentially.

5. The computer-readable medium of claim 1, comprising instructions to instruct, using the one or more processors, the first subset of virtual controllers to read results of the one or more previous simulation steps from a shared memory when the simulation instruction is received to enable the first subset of virtual controllers to execute the simulation step based at least in part on the results of the one or more previous simulation steps.

6. The computer-readable medium of claim 1, comprising instructions to instruct, using the one or more processors, each of the first subset of virtual controller to write results of the simulation step to a shared memory to enable a second subset of virtual controllers to execute the next simulation step based at least in part on the results of the simulation step.

7. The computer-readable medium of claim 1, comprising instructions to instruct, using the one or more processors, the plurality of virtual controllers to execute the simulation step, the one or more previous simulation steps, the next simulation step, or any combination thereof asynchronously from the operation of the industrial system.

8. A method of operating a simulation system to simulate operation of an industrial system using a plurality of virtual controllers, comprising:

receiving, using an intermediary in the simulation system, a simulation instruction from a simulation executive to execute a simulation step in the simulation system, wherein the operation of the industrial system is controlled based at least in part on results from execution of the simulation step;

determining, using the intermediary, a first subset of virtual controllers from the plurality of virtual controllers to use to execute the simulation step;

determining, using the intermediary, whether each of the first subset of virtual controllers has completed execution of one or more previous simulation steps;

instructing, using the intermediary, each of the first subset of virtual controllers to begin execution of the simulation step once each of the first subset of virtual controllers has completed execution of the one or more previous simulation steps; and transmitting, using the intermediary, an initiation complete status to the simulation executive once the simulation step has been initiated in each of the first subset of virtual controllers without regard to whether execution of the simulation step has been completed.

9. The method of claim 8, wherein instructing each of the first subset of virtual controllers to begin execution of the simulation step comprises instructing each of the first subset of virtual controllers to execute the simulation step on a separate computing thread.

10. The method of claim 8, wherein instructing each of the first subset of virtual controllers to begin execution of the simulation step comprises instructing each of the first subset of virtual controllers execute the simulation step on a separate processing core.

11. The method of claim 8, comprising instructing, using the intermediary, each of the first subset of virtual controllers to write results of the simulation step to a shared memory to enable a second subset of virtual controllers to execute a next simulation step based at least in part on the results of the simulation step.

12. The method of claim 8, comprising instructing, using the intermediary, the first subset of virtual controllers to read results of the one or more previous simulation steps from a shared memory when the simulation instruction is received to enable the first subset of virtual controllers to execute the simulation step based at least in part on the results of the one or more previous simulation steps.

13. The method of claim 8, comprising instructing, using the intermediary, the plurality of virtual controllers to execute the simulation step, the one or more previous simulation steps, or any combination thereof asynchronously from the operation of the industrial system.

14. An industrial system comprising:

a control system comprising a plurality of controllers configured to control operation of equipment in the industrial system; and a simulation system communicatively coupled to the control system, wherein the simulation system is configured to simulate operation of the industrial system, and comprises:

a simulation executive configured to coordinate operation of the simulation system;

a plurality of virtual controllers, wherein each of the plurality of virtual controllers is configured to use a model that models operation of any combination of the plurality of controllers and the equipment; and a communication interface communicatively coupled to the simulation executive and each of the plurality of virtual controllers, wherein the communication interface is configured to:

receive a simulation instruction from the simulation executive to execute a simulation step;

instruct a first subset of the plurality of virtual controllers to begin execution of the simulation step while a second subset of the plurality of virtual controllers continues execution of a previous simulation step; and transmit an initiation complete status to the simulation executive once the simulation step has been initiated in each of the first subset of virtual controllers without regard to whether execution of the simulation step has been completed.

15. The industrial system of claim 14, wherein the model comprises:
component models configured to model operation of the equipment in the industrial system;
a controller model configured to model operation of one or more of the plurality of controllers;
a process model configured to model operation of a process in the industrial system; or
any combination thereof.

16. The industrial system of claim 14, wherein the simulation system comprises a multi-threaded processor, wherein each of the first subset is configured to execute the simulation step on a separate computing thread of the multi-threaded processor.

17. The industrial system of claim 14, wherein the simulation system comprises a multi-core processor, wherein each of the first subset is configured to execute the simulation step on a separate processing core of the multi-core processor.

18. The industrial system of claim 14, comprising a shared memory communicatively coupled to each of the plurality of virtual controllers;
wherein each virtual controller of the first subset is configured to:
store results from execution of the simulation step in the shared memory after completing execution of the simulation step; and
retrieve at a least a portion of results from execution of the previous simulation step from the shared memory before execution of the simulation step.

19. The industrial system of claim 14, wherein the plurality of virtual controllers are configured to simulate the operation of the industrial system asynchronously from the operation of the industrial system.

20. The industrial system of claim 14, wherein the industrial system comprises a gas turbine system, a gasification system, a steam turbine system, a wind turbine system, a water turbine system, a power generation system, integrated gasification combined cycle system, or any combination thereof.

* * * * *